June 13, 1950 J. B. WADHAMS ET AL 2,511,026

METHOD FOR CONTROLLING HEATING BY AN INDUCTION HEATING CIRCUIT

Filed June 27, 1946 2 Sheets-Sheet 1

INVENTORS.
James B. Wadhams
Arthur W. Lateron
Joseph Sikorski

INVENTORS.
James B. Wadhams
Arthur W. Saterson
Joseph Sikorski

Patented June 13, 1950

2,511,026

UNITED STATES PATENT OFFICE 2,511,026

METHOD FOR CONTROLLING HEATING BY AN INDUCTION-HEATING CIRCUIT

James B. Wadhams, Arthur W. Sateren, and Joseph Sikorski, Cleveland, Ohio, assignors to The Ohio Crankshaft Company, Cleveland, Ohio, a corporation of Ohio Application June 27, 1946, Serial No. 679,622

3 Claims. (Cl. 219—47)

Figure 1:
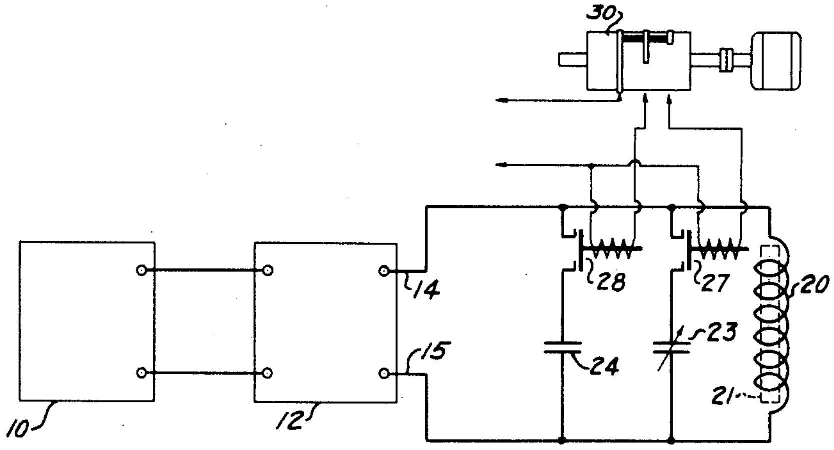

The present invention relates to electric induction heating and is concerned primarily with a method for tuning a load circuit supplied by a radio frequency generator or oscillator so as to control power being supplied to an inductor by the generator for heating a magnetic article and to attain temperatures not attainable by attaching an oscillator to an ordinary inductor circuit, to reach those temperatures rapidly, and to attain but not exceed any prescribed temperature regardless of the length of time during which power is supplied to the inductor.

Heretofore it has been found to be very difficult to arrange a circuit supplied by current at radio frequencies so that the circuit will accept sufficient power to heat to high temperature a magnetic article placed in inductive relation with a member of that circuit. Such circuits will quite readily heat a given magnetic article to critical or non-magnetic temperature, (known as the Curie point or Curie temperature), but when such temperature has been reached characteristics of the circuit are changed by the change of the magnetic properties of the charge being heated and the ability of the circuit to accept more power is rapidly reduced to such an extent that it is not possible to accomplish a further rise in temperature of the given article. The power actually drops off and the article will continue to remain at critical temperature regardless of how long power is supplied, the power acceptance of the circuit being such as to maintain the temperature substantially constant. Heretofore, it has been customary to vary the impedance load matching of the heating circuit by adding capacitance or the like to rematch the load circuit to the power source, the result being an immediate increase in power acceptance of the load and a corresponding rapid increase in the temperature of the article being heated. So long as power is applied to the load circuit, the piece will continue to heat until some maximum temperature which is usually above the melting point of the metal is reached. In order to prevent the workpiece from being melted, it is normally customary to completely turn off the power. If the workpiece must be held at this temperature for any length of time, it is customary to reduce power or to turn the power on and off at intervals to add or to make up for the heat lost by radiation, conduction or otherwise. Reducing power or turning the power on and off introduces complications, unevenness in temperature in the workpiece, requires accurate control and a considerable degree of watchfulness on the part of the operator to prevent the piece from being overheated, if not melted.

We have found that if a capacitor is used for the purpose of rematching the load circuit to the power source so as to permit heating beyond the Curie point and that if this capacitor is removed when the workpiece reaches the desired higher temperature, the workpiece will then retain this higher temperature even though the power delivered by the power source returns to the maximum deliverable at the lower temperature before the capacitor was inserted. Thus, for any given power source and load, a single contactor and single capacitor only are required in order to rematch the load after the Curie point is reached so that the Curie point can be exceeded, and then to hold the workpiece at the desired high temperature.

Accordingly the present invention has for one of its objects a method to automatically reduce power input to an article to be heated and to hold temperature in a selected part of the said article substantially constant for a prolonged interval of time. An additional object is to provide a method for heating an object by electric induction heating, wherein the impedance of the load circuit varies as the piece is heated, to a predetermined temperature and holding that predetermined temperature for indefinite periods of time using a minimum of equipment. Another object is to provide a method of heating an object substantially to a maximum obtainable temperature using one set of circuit conditions, altering the circuit condition to enable heating the piece to higher temperatures and restoring the heating circuit to the original circuit conditions whereby to hold the workpiece at the higher attained temperature. A further object has been to greatly reduce cost of equipment required to accomplish a predetermined heating effect. A still further object has been to provide a method for obtaining a greater power output from a given radio frequency generator.

A specific object of the invention is the provision of a new and improved method of heating a ferrous workpiece by electric induction heating to a desired temperature substantially above the Curie point thereof and holding the workpiece at that temperature comprising providing an electric power source, an inductor inductively coupled to the workpiece and a capacitor adapted to control the load impedance of the workpiece-coupled inductor on the power source, flowing radio-frequency current from the power source to the inductor at a predetermined load impedance on the source to preliminarily heat the workpiece substantially to the Curie point, the attainment of the Curie point reducing the power acceptance of the workpiece such that the temperature will not increase further at that load impedance, connecting the capacitor to the load circuit to change the load impedance to increase the power acceptance of the workpiece and effecting an increase in temperature substantially above the Curie point and then removing the capacitance from the circuit whereby to lower the power acceptance of the workpiece but maintain the article at the desired higher temperature above the Curie point.

With these and other objects in view said invention then consists of the method hereinafter described. One form of the apparatus is shown in the accompanying drawings to which reference is made in the following description.

Figure 2:
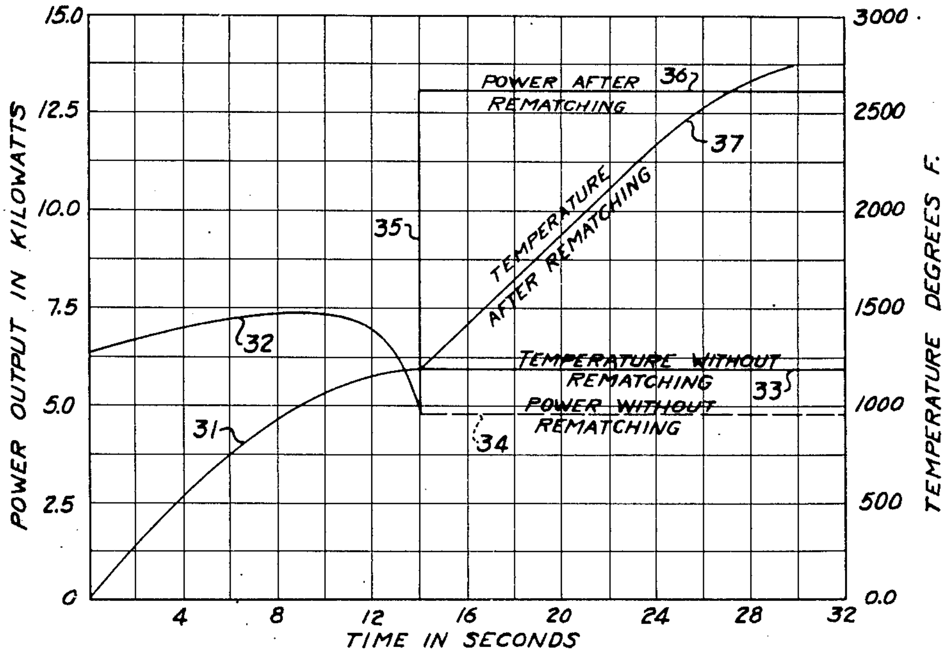
Figure 3:
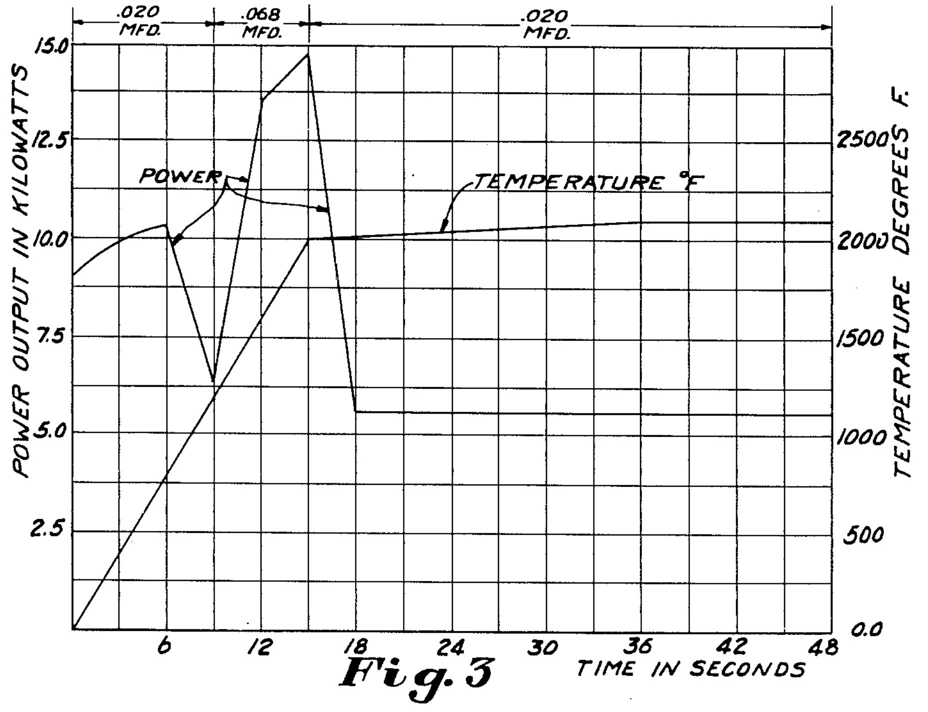
Figure 4:
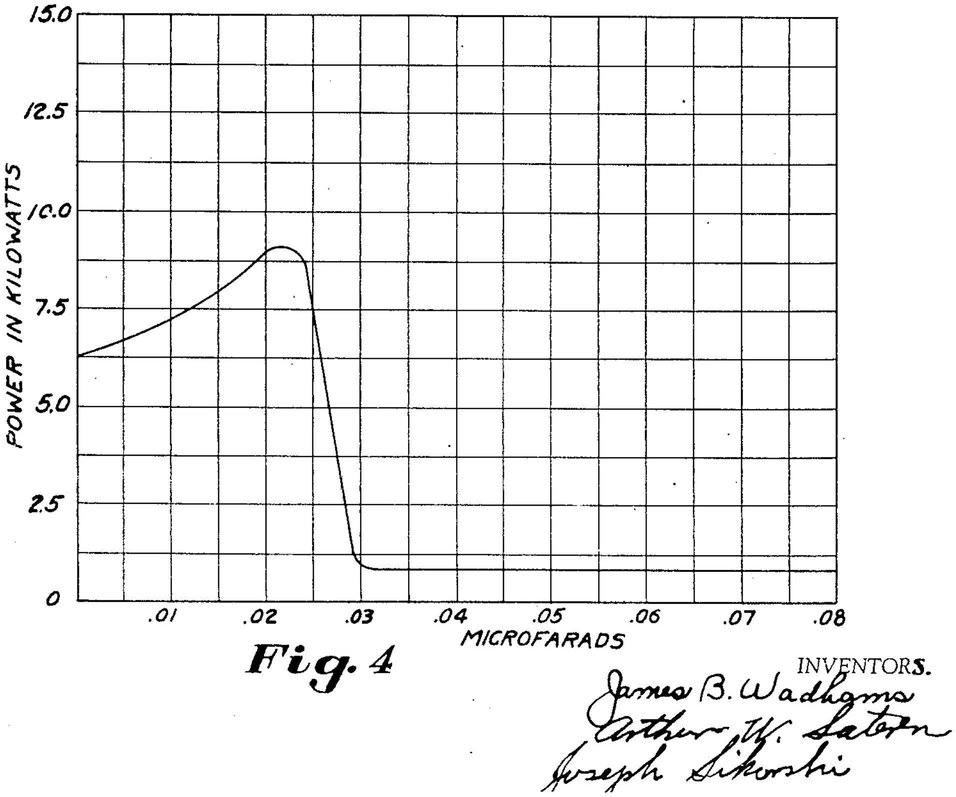

In the said drawings: Fig. 1 is a diagram showing the usual wiring arrangement. Fig. 2 is a chart showing variations in current demand and temperatures resulting from two changes in capacitance provided in the circuit of Fig. 1. Fig. 3 is a chart showing the variation of power output of the power source and temperature of the workpiece plotted in relation to time as the capacitance and the load circuit are varied in specified increments. Fig. 4 is a chart showing variation of power accepted by the heating circuit relative to variations of capacitance in that circuit.

As shown diagrammatically in Fig. 1, power at radio frequency is supplied by generator 10 which may be constructed in various ways such as by the use of electronic tubes or by use of spark gaps. This generator supplies power to a tank circuit 12 which contains properly selected inductance and capacitance to produce resonance under normal conditions existing in a load or heating circuit connected thereto by connectors such as 14 and 15.

This load circuit comprises heating coil 20 which is so constructed as to receive the charge 21 to be heated in correct heating relationship and a condenser circuit comprising a variable condenser such as 23 or one or more additional condensers such as 24 which are selectively connected by switches 27 and 28 or other suitable switching means to provide desired resonance in the heating circuit.

It is known that with a given work piece inserted in coil 20 and with power at radio frequency supplied by generator 10 of normal capacity, the work piece, if of ferrous material, will be heated to, but not much above the critical or Curie temperature. Further application of power is incapable of producing a further rise in temperature unless a radio frequency generator of much greater power rating is substituted for generator 10. It is known that by materially changing the capacity of condenser 23 or by inserting another and larger condenser such as 24 in its place, the work circuit will immediately accept more power through the main tank circuit 12 from generator 10 and the temperature which may have remained substantially constant at or slightly above the Curie point will quickly rise to an amount depending on the increased capacity provided by condenser 24. If condenser 24 has necessary capacity the work piece can be brought to melting temperature in a few seconds; whereas applying power for several minutes without this change of capacity will produce no appreciable change in temperature of the work piece.

We have discovered that by removing condenser 24; that is, restoring the original circuit conditions after any desired higher temperature has been reached that that temperature can readily be held for indefinite intervals of time by merely continuing to apply power with condenser 23 alone or in some cases without any condenser at all. In addition it has been found that any relatively small increase in capacity of condenser 23 will produce a correspondingly small increase in temperature of the article, which temperature will be held as long as that condenser without further change remains in the circuit. This greatly increased power is supplied to the work piece without in any way overloading the radio frequency generator 10. The circuit conditions are thus changed to permit generator 10 to operate more efficiently.

By using one or more photo electric cells arranged relatively to the work substantially as shown in Patent No. 2,329,188 by F. S. Denneen and W. C. Dunn and owned by the assignee of this application, one or more suitable relays are energized to operate switches 27 and 28 to increase capacity and another cell is readily applicable to deenergize these switches or operate another one to arrest further heating and to hold any desired temperature attained. It has been found more convenient, however, to control the condenser control by means of a timer 30 which is set to start when heating in coil 20 starts and which through solenoid operated switches 27 and 28 control the time when and during which condensers 23 and 24 are applied in the heating circuit.

The curves or graphs of Fig. 2 clearly show the variations of power being supplied to the load and corresponding variations in temperatures of the work piece, both being plotted relative to the time during which power had been applied. It will be observed that power supplied to the load as shown by curve 32 increased gradually from about 6.3 kilowatts at the beginning to about 7.4 kilowatts at the end of the first 10 seconds with a rise in temperature of the work piece to about 1100° F. At this point the magnetic characteristics of the charge began to change reducing the ability of the circuit to accept more power so that at the end of 14 seconds the circuit would accept only about 4.7 kilowatts and the rate of temperature increase as shown by curve 31 had leveled off at a temperature of about 1200° F. A continued application of power without any change in the circuit resulted in no change in power supply as shown by line 34 or in temperature as is evident by straight line 33.

By inserting more capacity at any point along lines 33 and 34 an immediate increased occurs in the power and temperature. Fig. 2 shows this change in capacity as having been made substantially at the instant the temperature leveled off as shown by line 33. It will be observed that at the instant the condenser switch was closed the power acceptance of the circuit increased instantly along vertical line 35 from 4.7 kilowatts to 13.2 kilowatts where it remained constant as indicated by line 36 corresponding to the amount of capacity inserted, and the temperature immediately began to increase rapidly as indicated by line 37 reaching 2500° F. in about 12 seconds after the increased capacity had been inserted.

The curves of Fig. 3 further illustrate results accomplished by changes in capacity in the load tank circuit. By inserting .02 microfarad in this circuit the power output rises rather slowly from about 8.9 kilowatts to 10.3 kilowatts in six seconds and then drops off very rapidly in the next three seconds during which the temperature of the charge being heated rises to about 1200° F. If the capacity of the circuit is then increased to .068 microfarad the power rises sharply from 6.3 kilowatts to about 13.7 kilowatts in three seconds. As the temperature of the charge approaches 2000° F., the rate of power increase becomes less and at that temperature by reducing the capacity again to .02 microfarad the power drops rapidly in about three seconds from about 14.7 kilowatts to 5.6 kilowatts where it remains substantially constant for an indefinite interval of time during which the temperature of the load rises gradually during an interval of about 30 seconds at which time it levels off and both power and temperature of the load remain substantially constant indefinitely. From this it will be observed that by inserting and removing capacity in correct amounts at properly spaced time intervals a relatively high temperature of the load can be reached very quickly with very favorable power characteristics and the temperature desired to be attained can be retained for almost any desired interval of time. Such control of heating is highly desirable in many heat treating operations and permits holding forging stock ready for the hammer at a required temperature without any physical adjustments.

It will be observed that the amount of capacity is critical in attaining the desired results. Too much capacity has about the same effect as too little. When the critical amount is applied, the power approaches a maximum. The critical character of the amount of capacitance is illustrated in the graph of Fig. 4, from which it will be observed that power accepted by the circuit increases progressively from 6.25 kilowatts with no capacitance to a maximum of about 8.6 kilowatts when the circuit contains a condenser of about .0225 microfarad rating. The power acceptance then drops rapidly to a minimum of about 0.85 kilowatt with .03 microfarad in the circuit and remains substantially constant at that amount of power regardless of how much the capacity of the circuit is increased.

Other modes of applying the principle of our invention may be employed instead of the one explained, change being made as regards the means herein disclosed, and the method employed provided those modes stated by any of the following claims or their equivalents be employed.

We, therefore, particularly point out and distinctly claim as our invention:

1. The method of electric induction heating a ferrous workpiece to a desired temperature well above the Curie point thereof and holding the workpiece at that temperature by means of an electric power source having a load circuit including an inductor coupled to the workpiece, the imput impedance of which load circuit varies as the workpiece temperature changes; comprising, flowing a high-frequency current in said inductor at a predetermined input impedance to effect a maximum transfer of power to the workpiece until the temperature of the article approaches the Curie point and the transfer of power to the workpiece commences to drop off, then connecting a capacitor to effect a new input impedance to effect an increased transfer of power to the load until the workpiece reaches a desired higher temperature substantially above the Curie point, disconnecting said capacitor to effect a mismatching of impedances to lower the transfer of power to the workpiece substantially to the original maximum value at the Curie point temperature; while, at the same time, maintaining the temperature of the workpiece at the higher attained temperature.

2. The method of heating a ferrous workpiece by electric induction heating to a desired temperature substantially above the Curie point thereof and holding the workpiece at that temperature; comprising, providing an electric power source, an inductor inductively coupled to the workpiece and a capacitor adapted to control the load impedance of the workpiece-coupled inductor on the power source, flowing radiofrequency current from the power source to the inductor at a predetermined load impedance on the source to preliminarily heat the workpiece substantially to the Curie point, the attainment of the Curie point reducing the power acceptance of the workpiece such that the temperature will not increase further at that load impedance, connecting the capacitor to the load circuit to change the load impedance to increase the power acceptance of the workpiece and effecting an increase in temperature substantially above the Curie point and then removing said capacitance from the circuit whereby to lower the power acceptance of the workpiece but maintain the article at the desired higher temperature above the Curie point.

3. In the method of heating a ferrous article consisting of inductively applying high-frequency electric power to the workpiece until the workpiece approaches the Curie point thereof and the power commences to drop off, adding a fixed and predetermined amount of capacitance to the power load circuit to increase the power acceptance of the workpiece and heat same to a temperature substantially above the Curie point; the improvement which consists in: removing the exact amount of capacitance added as the workpiece originally approached the Curie point to lower the power transfer to the workpiece, but retaining the piece at the higher temperature.

JAMES B. WADHAMS.
ARTHUR W. SATEREN.
JOSEPH SIKORSKI.

REFERENCES CITED

The following references are of record in the file of this patent:

UNITED STATES PATENTS

| Number | Name | Date |
|---|---|---|
| 1,642,198 | Gerth et al. | Sept. 13, 1927 |
| 1,833,617 | Northrup | Nov. 24, 1931 |
| 1,931,644 | Chesnut | Oct. 24, 1933 |
| 1,948,704 | Fischer | Feb. 27, 1934 |
| 2,147,689 | Chaffee | Feb. 21, 1939 |
| 2,205,424 | Leonard | June 25, 1940 |
| 2,324,525 | Mittelmann | July 20, 1943 |
| 2,329,188 | Denneen et al. | Sept. 14, 1943 |
| 2,416,172 | Gregory et al. | Feb. 18, 1947 |